No. 871,509. PATENTED NOV. 19, 1907.
F. JORDAN.
COMPRESSED AIR BRAKE.
APPLICATION FILED MAR. 30, 1907.

Witnesses:
L. H. Staaden.
Bernh. Zwillinger.

Inventor
Franz Jordan,
by [signature]
Atty.

UNITED STATES PATENT OFFICE.

FRANZ JORDAN, OF KÖTHEN, GERMANY.

COMPRESSED-AIR BRAKE.

No. 871,509.

Specification of Letters Patent.

Patented Nov. 19, 1907.

Application filed March 30, 1907. Serial No. 365,494.

*To all whom it may concern:*

Be it known that I, FRANZ JORDAN, residing at Köthen, in the Duchy of Anhalt and German Empire, have invented new and useful Improvements in Compressed-Air Brakes, of which the following is a specification.

The subject of my invention is a compressed air brake for lifting apparatus, whereby the rate of descent may be kept uniform for all loads.

The compressed air brakes hitherto employed for hoisting apparatus all have the defect that their regulation is extremely difficult and if they are operated from a distance is, in fact, altogether impossible. They can, therefore, only be employed as stopping brake, but not for insuring uniform descent of the loads through considerable distances. Such compressed air braking apparatus, therefore, only admits of limited use and other brakes though neither so safe in their action, nor so economical in use, nor so simple in construction and operation, cannot be dispensed with.

My present invention consists in combining the compressed air brake disclosed in German Patent Nr. 138045 with an electrically actuated valve and with a centrifugal weight governor, whereby I am enabled to insure uniform rate of descent for all loads. The compressed air necessary for working (*i. e.* applying or slacking) the brake, is obtained according to the patent cited by means of a compressor positively coupled with the lifting apparatus. The load thus produces automatically and in the simplest manner, free of cost, the compressed air requisite for braking.

Figure 1:
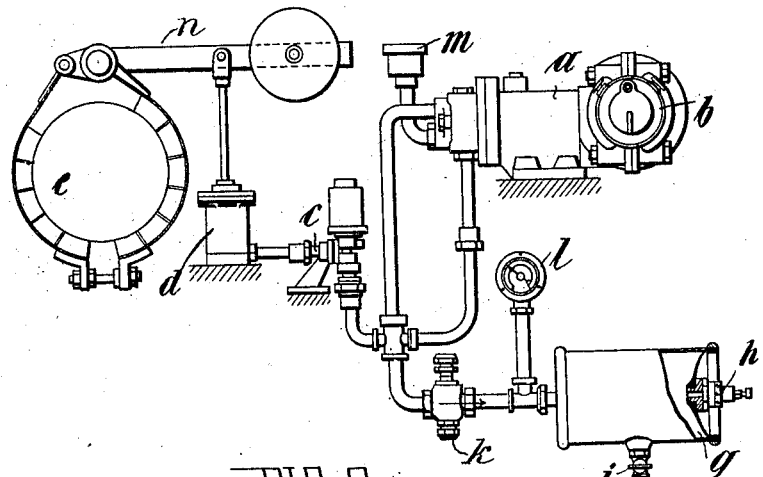
Figures 2, 4:
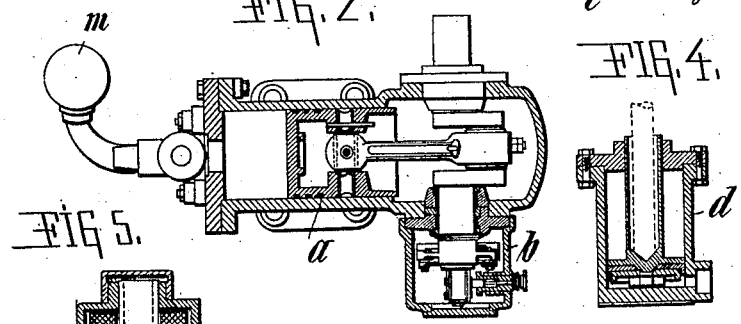
Figure 5:
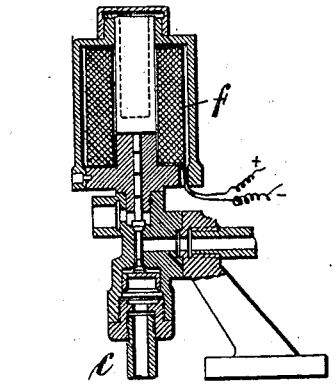
Figure 3:
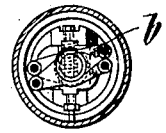

One form of construction of such a braking apparatus is illustrated in the accompanying drawing, in which Figure 1 is a general view in elevation and part section; Fig. 2 a horizontal section through the compressor, with centrifugal weight governor; Fig. 3 a vertical section through the governor; Fig. 4 a vertical section through the brake cylinder; Fig. 5 a vertical section through the electromagnetic valve.

$a$ is a compressor, provided with a centrifugal weight governor $b$. The compressor is connected by a pipe $c$ with a brake cylinder $d$ which is permanently connected with, that is, acts upon, a brake disk $e$. The braking device in the example shown, is applied to the disk $e$ by the weighted lever $n$ carried by the piston-rod of the brake cylinder $d$. Compressed air, coming from the compressor $a$, will lift said rod and release the brake, and the brake will be tightened or applied in the same degree, as the pressure in the cylinder $d$ is lowered. The admission and outlet of the air and the amount of pressure in the brake cylinder is controlled by an electrically actuated valve $f$, which is thrown into and out of operation by a handswitch (not shown in the drawing) and by the centrifugal weight governor $b$ rotating with the compressor or the lifting apparatus. The governor $b$ is adjusted by means of a spring for a definite number of revolutions or rate of descent. Depending upon whether its speed of rotation is higher or lower than the same, it interrupts or closes the circuit of the electromagnetic valve $f$ thus causing the compressed air brake to be alternately tightened or slacked.

In view of the high degree of sensitiveness of the centrifugal weight governor and of the electromagnet $f$, whose induction current causes no serious difficulties owing to the gradual opening of the contacts in the centrifugal weight governor; in view of the high degree of elasticity and rate of exit of the compressed air; and in view of the heavy rotating masses of the lifting gear; the regulation of the descent of the load is effected with such precision that the loads can be lowered at almost uniform rate and without the occurrence of shocks. $g$ is an air reservoir connected with the compressor $a$ and fitted with a safety valve $h$ and a discharge cock $i$. In the pipe connecting the compressor $a$ with the air reservoir $g$ there is a stop cock $k$ and a pressure-gage $l$.

The purpose of the valve $k$ is to enable rapid automatic release of the brake on starting work or taking it up after a long pause, when there is no compressed air in the air reservoir. When the said reservoir $g$ has been filled up with compressed air under a predetermined pressure to be ascertained by the gage $l$, the valve $k$ is closed and the compressed air kept stored in the reservoir $g$ for use, *i. e.* for compensating the lacking pressure of the compressor $a$, on starting work or taking it up after a long pause. The compressed air in the reservoir $g$, in such a case, will be supplied to the brake cylinder $d$, under control of the valve $f$, until the compressor $a$ will be in operation to supply the required pressure. There is thus no danger of overloading of the hoisting motor, even in the event of its working with maximum load and applied brake.

In order to keep the interior parts of the brake device clear from dust and dirt, the compressor draws in the air through a suction device $m$, or takes it from a filter or from a tightly closed reservoir into which the dust-free air escaping from the brake cylinder is conducted.

The law according to which the descending movement proceeds may be expressed mathematically. L being the load on the hook, and R the frictional resistance of the lifting gear, $Bx$ the braking power, varying between zero and its maximum value, and M the masses moved, all referred to the hook, $\frac{dv}{dt}$ = ratio of velocity of hook-decrease or increase in time $dt$.

According to the principle of mechanics, force = mass × acceleration, the equation of motion is then: $\frac{dv}{dt} = \frac{L-R-Bx}{M}$.

The centrifugal weight governor at the same time offers the advantage that overstepping of the normal rate of descent is rendered impossible. The retarding and stopping of the loads is effected by simply interrupting the generator circuit by means of a hand-switch. In place of the valve shown, a slide valve might equally well be employed; and instead of air any other fluid might be made use of.

What I do claim as my invention and desire to secure by Letters Patent, is:—

In electrically driven lifting apparatus, in combination, a braking device, a brake cylinder therefor, an electromagnetically actuated valve regulating the supply of a pressure agent to the brake cylinder, and a centrifugal weight governor controlling the electric circuit of said valve, substantially as and for the purposes described.

In testimony whereof I have signed my name to this specification in the presence of two subscribing witnesses.

FRANZ JORDAN.

Witnesses:
 RUDOLF LANDGRAT,
 LUDWIG WEYRICH.